(12) United States Patent
Koivisto et al.

(10) Patent No.: US 8,811,516 B2
(45) Date of Patent: Aug. 19, 2014

(54) CHANNEL FEEDBACK TO SUPPORT EFFICIENT RANK OVERRIDE

(75) Inventors: Tommi Tapani Koivisto, Espoo (FI); Timo Eric Roman, Espoo (FI); Mihai Horatiu Enescu, Espoo (FI); Karol Schober, Helsinki (FI)

(73) Assignee: Nokia Corporation, Espoo (FI)

( * ) Notice: Subject to any disclaimer, the term of this patent is extended or adjusted under 35 U.S.C. 154(b) by 50 days.

(21) Appl. No.: 13/502,858

(22) PCT Filed: Oct. 29, 2010

(86) PCT No.: PCT/IB2010/054920
§ 371 (c)(1),
(2), (4) Date: Apr. 19, 2012

(87) PCT Pub. No.: WO2011/051914
PCT Pub. Date: May 5, 2011

(65) Prior Publication Data
US 2012/0201321 A1    Aug. 9, 2012

Related U.S. Application Data

(60) Provisional application No. 61/272,760, filed on Oct. 30, 2009.

(51) Int. Cl.
*H04B 7/02* (2006.01)
(52) U.S. Cl.
USPC ........... 375/267; 375/259; 375/260; 375/295; 375/285; 375/299
(58) Field of Classification Search
USPC ................. 375/267, 259, 260, 295, 285, 299
See application file for complete search history.

(56) References Cited

U.S. PATENT DOCUMENTS

| | | | |
|---|---|---|---|
| 8,098,752 B2 * | 1/2012 | Hwang et al. | 375/260 |
| 2004/0042427 A1 | 3/2004 | Hottinen | |
| 2008/0063115 A1 | 3/2008 | Varadarajan et al. | |
| 2008/0101407 A1 * | 5/2008 | Khan et al. | 370/468 |
| 2008/0188190 A1 * | 8/2008 | Prasad et al. | 455/114.3 |
| 2008/0192718 A1 * | 8/2008 | Jongren et al. | 370/342 |
| 2008/0260059 A1 * | 10/2008 | Pan | 375/260 |
| 2008/0292013 A1 | 11/2008 | Varadarajan et al. | |
| 2008/0298482 A1 * | 12/2008 | Rensburg et al. | 375/260 |
| 2009/0046801 A1 | 2/2009 | Pan et al. | |
| 2009/0086842 A1 | 4/2009 | Shi et al. | |
| 2009/0122857 A1 | 5/2009 | Li et al. | |

(Continued)

FOREIGN PATENT DOCUMENTS

WO    2008/051038 A1    5/2008

OTHER PUBLICATIONS

Love et al., "Limited Feedback Unitary Precoding for Spatial Multiplexing Systems", IEEE Transactions on Information Theory, vol. 51, No. 8, Aug. 2005, pp. 2967-2976.

(Continued)

*Primary Examiner* — Siu Lee
(74) *Attorney, Agent, or Firm* — Nokia Corporation

(57) ABSTRACT

A method can include providing channel feedback to support efficient rank override For example, in such a method, a rank-r precoder index corresponding to a rank-r precoder is determined, and performance for each rank-1 precoder within the rank-r precoder is measured Based on the measured performance, a rank-1 precoder that maximizes performance is selected.

17 Claims, 11 Drawing Sheets

(56) References Cited

U.S. PATENT DOCUMENTS

| | | | |
|---|---|---|---|
| 2009/0128381 A1 | 5/2009 | Choi et al. | |
| 2009/0257383 A1 | 10/2009 | Lee et al. | |
| 2010/0046461 A1* | 2/2010 | Wennstrom | 370/329 |
| 2010/0208838 A1* | 8/2010 | Lee et al. | 375/267 |
| 2011/0032839 A1* | 2/2011 | Chen et al. | 370/252 |
| 2011/0105164 A1* | 5/2011 | Lim et al. | 455/501 |

OTHER PUBLICATIONS

"Further Discussions on Feedback Framework for SU/MU-MIMO", Samsung, 3GPP TSG RAN WG1 Meeting #58bis, R1- 094092, Agenda Item: 7.5, Oct. 12-16, 2009, 6 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.8.0, Sep. 2009, pp. 53-54.

Clerckx et al., "Structure of SU and MU-MIMO Codebooks", IEEE 802.16 Broadband Wireless Access Working Group, IEEE 802.16m Contribution, Jul. 14, 2008, 23 pages.

"Downlink Feedback Framework for LTE-Advanced", Nokia Siemens Networks, Nokia, 3GPP TSG RAN WG1 Meeting #58bis, R1-093912, Agenda Item: 7.5, Oct. 12-16, 2009, 6 pages.

"Consideration on CSI-RS Design for CoMP and Text Proposal to 36.814", Huawei, 3GPP TSG RAN WG1 meeting #58, R1-093031, Agenda Item: 15.1, Aug. 24-28, 2009, 8 pages.

"CoMP Email Summary", Qualcomm Europe, 3GPP TSG-RAN WG1 #58, R1-093720, Agenda Item: 15.2, Aug. 24-28, 2009, pp. 1-11.

"Best Companion Reporting for Single-Cell MU-MIMO Pairing", Alcatel-Lucent, Alcatel-Lucent Shanghai Bell, 3GPP TSG RAN WG1 #58bis Meeting, R1-093779, Agenda Item: 7.5, CoMP: Feedback in support of Multi-Antenna DL transmission, Oct. 12-16, 2009, pp. 1-6.

International Search Report and Written Opinion received for corresponding International Patent Application No. PCT/IB2010/054920, dated Mar. 16, 2011, 17 pages.

Kaltenberger et al., "Capacity of Linear Multi-User MIMO Precoding Schemes With Measured Channel Data", IEEE 9th Workshop on Signal Processing Advances in Wireless Communications, Jul. 6-9, 2008, pp. 580-584.

Mondal et al., "Rank-Independent Codebook Design From a Quaternary Alphabet", Conference Record of the Forty-First Asilomar Conference on Signals, Systems and Computers, Nov. 4-7, 2007, pp. 297-301.

* cited by examiner

For transmission on four antenna ports, $p = \{0,1,2,3\}$, the precoding matrix $W$ shall be selected from Table 6.3.4.2.3-2 or a subset thereof. The quantity $W_n^{\{s\}}$ denotes the matrix defined by the columns given by the set $\{s\}$ from the expression $W_n = I - 2u_n u_n^H / u_n^H u_n$, where $I$ is the $4 \times 4$ identity matrix and the vector $u_n$ is given by Table 6.3.4.2.3-2.

Table 6.3.4.2.3-2: Codebook for transmission on antenna ports $\{0,1,2,3\}$.

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Fig. 8

CHANNEL FEEDBACK TO SUPPORT EFFICIENT RANK OVERRIDE

RELATED APPLICATION

This application was originally filed as PCT Application No. PCT/IB2010/054920 filed Oct. 29, 2010, which claims priority to U.S. Application No. 61/272,760 filed Oct. 30, 2009.

BACKGROUND

1. Field

Embodiments of the invention relate to communications networks and particularly to wireless communications networks, such as the Universal Mobile Telecommunications System (UMTS) Terrestrial Radio Access Network (UTRAN) Long Term Evolution (LTE) and Evolved UTRAN (E-UTRAN). More specifically, certain embodiments of the invention are directed to methods, systems, apparatuses and/or computer programs for providing efficient channel feedback in LTE systems.

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

SUMMARY

One embodiment is directed to a method. The method includes determining a rank–r index or rank–r PMI corresponding to a rank–r precoder, measuring performance for each rank–1 precoding vector within the rank–r precoder, and selecting, based on the measured performance, a rank–1 precoding vector that maximizes performance.

Another embodiment is directed to an apparatus. The apparatus includes at least one processor, and at least one memory including computer program code. The at least one memory and the computer program code are configured, with the at least one processor, to cause the apparatus at least to determine a rank–r index corresponding to a rank–r precoder, measure performance for each rank–1 precoding vector within the rank–r precoder, and select, based on the measured performance, a rank–1 precoding vector that maximizes performance.

Another embodiment is directed to a computer program embodied on a computer readable storage medium. The computer program is configured to control a processor to determine a rank–r index corresponding to a rank–r precoder, measure performance for each rank–1 vector within the rank–r precoder, and select, based on the measured performance, a rank–1 precoding vector that maximizes performance.

Another embodiment is directed to a method. The method includes determining a linear combiner that optimizes information about a rank–1 precoding vector. The linear combiner is based in at least one codebook. The method further includes reporting, to a network node, an index of the codebook entry that optimizes the rank–1 performance.

Another embodiment is directed to an apparatus. The apparatus includes at least one processor, and at least one memory including computer program code. The at least one memory and the computer program code are configured, with the at least one processor, to cause the apparatus at least to determine a linear combiner that optimizes information about a rank–1 precoding vector. The linear combiner is based in at least one codebook. The at least one memory and the computer program code are also configured, with the at least one processor, to cause the apparatus to report, to a network node, an index of the codebook entry that optimizes the rank–1 performance.

Another embodiment is directed to a computer program embodied on a computer readable storage medium. The computer program is configured to control a processor to determine a linear combiner that optimizes information about a rank–1 precoding vector. The linear combiner is based in at least one codebook. The computer program is also configured to control the processor to report, to a network node, an index of the codebook entry that optimizes the rank–1 performance.

Another embodiment is directed to a method. The method includes determining a rank–1 precoder that optimizes performance, and reporting the rank–1 precoder index that maximizes performance to a network node. The reported rank–1 precoder index defines a precoder index group. The method further includes searching for an optimum rank–r precoder index, wherein the searching is restricted to the precoder index group defined by the rank–1 precoder index, and reporting the optimum rank–r precoder index to the network node.

Another embodiment is directed to an apparatus. The apparatus includes at least one processor, and at least one memory including computer program code. The at least one memory and the computer program code are configured, with the at least one processor, to cause the apparatus at least to determine a rank–1 precoder index that optimizes performance, and report the rank–1 precoder index that maximizes performance to a network node. The reported rank–1 precoder index defines a precoder index group. The at least one memory and the computer program code are also configured, with the at least one processor, to cause the apparatus to search for an optimum rank–r precoder index where the searching is restricted to the precoder index group defined by the rank–1 precoder index, and report the optimum rank–r precoder index to the network node.

Another embodiment is directed to a computer program embodied on a computer readable storage medium. The computer program is configured to control a processor to determine a rank–1 precoder index that optimizes performance, and report the rank–1 precoder index that maximizes performance to a network node. The reported rank–1 index defines a precoder index group. The computer program is also configured to control the processor to search for an optimum rank–r precoder index where the searching is restricted to the precoder index group defined by the rank–1 precoder index, and report the optimum rank–r precoder index to the network node.

Another embodiment is directed to a method. The method includes reporting a rank–1 precoder index that optimizes performance, computing a householder matrix that corresponds to the reported rank–1 precoder index, determining an optimum rank–r precoder based on different subsets of r columns of the computed householder matrix, and reporting an index of the optimum column subset to a network node.

Another embodiment is directed to an apparatus. The apparatus includes at least one processor, and at least one memory including computer program code. The at least one memory and the computer program code are configured, with the at least one processor, to cause the apparatus at least to report a rank–1 precoder index that optimizes performance, compute a householder matrix that corresponds to the reported rank–1 precoder index, determine an optimum rank–r precoder based on different subsets of r columns of the computed householder matrix, and report an index of the optimum column subset to a network node.

Another embodiment is directed to a computer program embodied on a computer readable storage medium. The computer program is configured to control a processor to report a rank–1 precoder index that optimizes performance, compute a householder matrix that corresponds to the reported rank–1 precoder index, determine an optimum rank–r precoder based on different subsets of r columns of the computed householder matrix, and report an index of the optimum column subset to a network node.

BRIEF DESCRIPTION OF THE DRAWINGS

For proper understanding of the invention, reference should be made to the accompanying drawings, wherein:

FIG. 8 illustrates a codebook in accordance with one embodiment;

DETAILED DESCRIPTION

Figure 1:
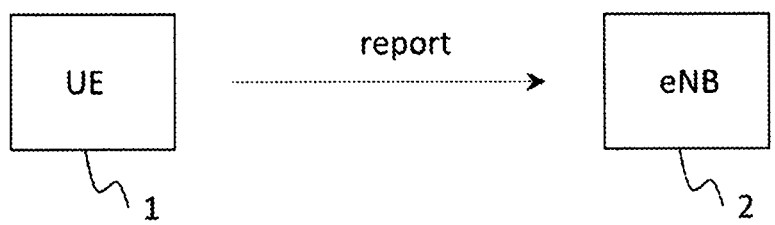
FIG. 1 illustrates a block diagram of a system according to one embodiment.

LTE includes a set of enhancements to the Universal Mobile Telecommunications System (UMTS) which is included in the 3rd Generation Partnership Project (3GPP) Release 8. 3GPP is currently studying potential enhancements to Release 8 LTE in order to specify a new system called LTE-Advanced which is supposed to fulfill the international mobile telecommunications (IMT)-Advanced requirements set by the International Telecommunications Union Radiocommunication Sector (ITU-R). Topics within the ongoing study item include, for example, bandwidth extensions beyond 20 MHz, relays, cooperative multiple input multiple output (MIMO) and other MIMO enhancements including enhancements to multi-user MIMO.

Single-user MIMO (SU-MIMO) refers to transmission of multiple data streams spatially multiplexed to one user. Multi-user MIMO (MU-MIMO), on the other hand, simply means that the multiple spatially multiplexed data streams are intended for different users. Spatial precoding techniques, such as zero-forcing (ZF) transmit precoding or block-diagonalization transmit precoding, may then be utilized to cancel the inter-user interference.

Cooperative MIMO, also known as coordinated multipoint (CoMP) transmission and reception, refers to a technique in which transmissions from several cells are coordinated together in order to mitigate co-channel inter-cell interference. In addition, several users may be scheduled (i.e., spatially multiplexed) on the same radio resources in a multi-user sense (e.g., on the same OFDM symbol—subcarrier grid) if there is sufficient channel state information, fed back by the user equipment, available at a base station in all cells. This type of cooperative MIMO is referred to in 3GPP as joint processing coordinated multipoint transmission (JP-CoMP). Another form of CoMP discussed in 3GPP is coordinated beamforming (CB) in which cells coordinate their transmitted beams such that the power at the desired user equipment (UE) is maximized while the interference to UEs scheduled on the same radio resources in neighboring cells is minimized.

In order to obtain gains from the aforementioned multi-antenna schemes, sufficient knowledge of channel state information, as seen by the UE, may be necessary at the eNB(s). Thus, embodiments of the invention provide efficient channel feedback suitable for multiple transmission schemes, such as single-cell SU/MU-MIMO, as well as CoMP. Embodiments of the invention additionally address the issue of optimizing the feedback to support efficient rank override that is needed for seamless operation between SU/MU-MIMO and CoMP.

Within 3GPP, a need has been identified for a "unified feedback" and seamless UE-transparent switches between different MIMO transmission schemes, such as between single-cell SU-MIMO, MU-MIMO and different CoMP schemes. "Unified feedback" refers to the same feedback being able to efficiently support various transmission schemes and the dynamic switching between them. As a result, eNBs are able to use any transmission scheme with the feedback it receives from UE.

Clearly, however, different schemes in general require different feedback to be reported by the UE. For example, in order to achieve maximum throughput, single-cell SU-MIMO typically requires all quantized dominant right singular vectors (signal space) of the channel matrix. Specifically, SU-MIMO usually requires the number of right singular vectors corresponding to the optimum transmission rank. Single-cell MU-MIMO, on the other hand, typically requires (assuming rank–1 MU-MIMO) only the right singular vector corresponding to the largest singular value. Alternatively, single-cell MU-MIMO could require, for each UE, the dominant right singular vector as well as the whole visible subspace (all vectors corresponding to non-zero singular values)

of the channel such that the eNB can schedule co-channel users using full knowledge of the null space of the channel of the UEs. In this way, UEs can be selected to be as much mutually orthogonal as possible in terms of channel subspaces.

For CoMP transmission schemes, JP-CoMP typically requires almost the same information as MU-MIMO for the serving cell, and the same information for neighboring cells, as well as information about inter-cell phase and amplitude differences in order to construct a proper joint transmit precoder over multiple cells. CB-CoMP (coordinated-beamforming), on the other hand, would require the optimum rank-r right singular space (vector) for the serving cell and null space of the channel for neighboring cells such that the neighboring cells can use precoders that minimize the interference towards the UE of interest by focusing their transmissions towards that specific null space.

As a result, for the serving cell, feedback could be unified to some extent by allowing the eNB to use either a rank-r precoding matrix that is mainly needed for SU-MIMO operation, or a rank-1 or rank-2 precoding vector that is mainly needed for MU-MIMO operation. Typically, both rank-r information and rank-1/rank-2 information are not available at the eNB at the same time to perform the switching efficiently. Switching from rank-r to rank<r is typically known as rank override, which essentially refers to the switching from SU-MIMO to MU-MIMO mode.

Normally, for example in 3GPP Release 8 LTE, the UE reports the useful channel subspace corresponding to the optimum rank using a pre-defined codebook. Codebooks are often designed such that they maximize the minimum distance between codebook entries using some distance metric, such as the chordal distance, which measures the distance between two subspaces (see, for example, D. J. Love and R. W. Heath, "*Limited feedback unitary precoding for spatial multiplexing systems*", IEEE Transactions on Information Theory, vol. 51, no. 8, August 2005). In addition, the LTE codebooks tend to compromise the minimum distance for spatial correlation compliance and some other desired properties, such as constant modulus and nested property. Nevertheless, the reported codeword only gives the full rank-r optimum subspace, and the only information that is available about the optimum rank-1 precoding vector is that it lies close to the reported subspace (i.e., the exact optimum rank-1 subspace could be any subspace of the reported rank-r subspace, or could be a completely different rank-1 codeword). Hence, the reported rank-r precoding matrix cannot be used for rank-1 transmission efficiently. The 3GPP Release 8 LTE codebook has been designed such that it has a so called nested property, which means that each rank-r codeword contains rank<r codewords as a subset of the precoding matrix (codeword) columns. Even with this property, the rank<r precoding matrix may not be the optimum one. For instance, the rank-1 precoding vector drawn from the columns of the rank-r precoding matrix is generally not the optimum rank-1 precoding vector (e.g., incurs ~2 dB loss in rank-2→rank-1 override case with 4Tx 3GPP LTE Release 8 codebook).

Another related problem is that the eNB has no exact knowledge about the channel quality indicator (CQI) if it overrides the rank, since the CQI reported by the UE is usually linked to rank and, therefore, will become mismatched after rank override. The CQI may, for instance, take the form of a modulation and coding rate indication which guarantees a given target block error rate. Mismatches in CQI may lead to throughput loss at the system level. Thus, current LTE specifications lack efficient feedback support to enable the eNB to override the rank preferred by the UE for single-cell SU-MIMO transmission, for example. To effectively support low rank transmissions with MU-MIND or CoMP with the same feedback, the optimum rank-1 precoding matrix index/channel quality indicator (PMI/CQI) may need to be derived from the reported rank-r PMI/CQI and/or the optimum rank-r PMI/CQI may need to be derived from the reported rank-1 PMI/CQI.

It is noted that one of the most relevant cases for the rank override may be the switching between SU-MIMO and MU-MIMO, as both schemes are applicable when operating in a moderate to high Signal to Interference-plus-Noise Ratio (SINR) region of the network. CoMP, however, is primarily a cell edge technique (i.e., low SINR) and, therefore, rank override may have less relevance even though there are still some cases where rank override may be beneficial. Accordingly, while embodiments of the invention may apply to all of the above-noted cases, it is not limited only to these situations.

One solution to the aforementioned problems is to report the best rank-1 precoding vector and related CQI, in addition to the rank-r PMI and CQI. While such a solution may improve performance, it may incur more signaling overhead than what is actually needed and the UE may need to perform completely separate PMI searches as the knowledge about the rank-r PMI (best subspace of the channel) is not taken into account.

The aforementioned nested property is another possible solution. The nested property makes sure that, in the rank-r PMI, there are rank<r PMIs embedded so that some of the columns of any rank-r codeword constitute a rank<r codeword. However, rank<r codewords derived in this way may not be the optimum ones. Nested property only guarantees that the transmission will avoid null space. The nested property is utilized in current 3GPP Release 8, for which the codebooks are described in TS 36.211 v.8.8.0 section 6.3.4.2.3. From a rank override perspective, the nested property is not important when precoded demodulation reference symbols (RS) are utilized as in LTE-Advanced (instead of common non-precoded RS). Hence, in this case, the nested property may be seen mainly as a UE computational complexity optimization feature.

In 3GPP Release 8, the rank override remained mostly untreated due to its seldom occurrence and required standardization effort in that respect. With transparent/dynamic switching between modes envisioned for LTE-Advanced, however, it may result in significant loss if the rank override issue is not addressed properly.

Therefore, embodiments of the invention provide at least methods, apparatuses, and/or computer programs that allow rank override to be performed efficiently. According to an embodiment, it is assumed the UE is reporting single-cell PMI and CQI of the desired (optimum) SU-MIMO rank N. Then, in one embodiment, the optimum rank-1 PMI and CQI are derived from the report provided by the UE. More specifically, in some embodiments, certain additional parameters are signaled from the UE to the eNB in order to allow the eNB to derive a better rank-1 PMI and CQI from the reported rank-r PMI/CQI without explicitly signaling the optimum rank-1 PMI and associated CQI themselves. In one example, the UE would report: (1) parameters to be used by the eNB to derive rank-1 PMI from rank-r PMI, and/or (2) delta CQI that is the difference between reported rank-r CQI and optimum rank-1 CQI (corresponding to the derived rank-1 PMI).

FIG. 1 illustrates a diagram of a system according to an embodiment of the invention. In one embodiment, the UE 1 signals to the eNB 2 which column of the reported rank-r precoding matrix is the best rank-1 precoder (out of the N columns). Furthermore, a delta-CQI may be added to the report from the UE 1 to the eNB 2, where the delta-CQI is given with respect to the CQI reported in the normal rank–r single-cell report, thereby saving bits compared to a full additional CQI report. As a result, in one embodiment, the delta-CQI can be used between two ranks.

In another embodiment, the UE 1 signals to the eNB 2 a linear combiner that can be utilized at the eNB 2 to use all columns of the reported rank–r PMI, and to combine those linearly in order to obtain an improved rank–1 PMI. Again, the delta-CQI will be the difference between the CQI corresponding to the resulting rank–1 PMI and the reported CQI corresponding to the rank–r PMI. The combiner may not depend on an amount of transmit antennas, but may depend on the type of override (i.e. the starting rank and targeted rank). This embodiment may in fact act as subspace ordering to obtain strongest eigenvector(s), which is beneficial for MU-MIMO.

Further, embodiments of the invention can take advantage of the LTE-Advanced codeword-to-layer mapping. Therefore, for instance, the examples of the invention outlined above can be used in the same way such that only the columns of the rank–r PMI corresponding to the codeword with better CQI are taken into account. This aspect will be discussed in more detail below.

It should be noted that embodiments of the invention do not require the nested property, but can also work if the codebook has the nested property. As a result, examples of the invention are independent of the availability of the nested property, as they may work with or without it.

Figure 2A:
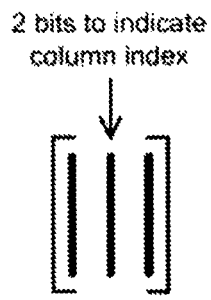
FIG. 2a illustrates an example of reporting a column index in accordance with one embodiment.

As outlined above, according to one embodiment, in addition to the rank–r PMI and corresponding CQI, the UE 1 may report additional bits to indicate which column of the reported rank–r PMI would be the optimum rank–1 PMI in case of rank override. In addition, the UE 1 may report a delta-CQI corresponding to the indicated rank–1 PMI. An example of this approach is illustrated in FIG. 2a. In this example, r=3 and, therefore, 2 bits are needed to indicate the best column. In general, ceil($\log_2(r)$) bits may be required for this indication.

In addition, for the rank–r PMI, the UE 1 may also report a corresponding CQI, or one CQI per codeword (in LTE-Advanced there is one CQI per codeword, and maximum of two codewords that are then mapped to different spatial layers). As a result, in this example, the UE 1 would report a delta-CQI that can then be used to derive the rank–1 CQI as CQI(rank–1)=CQI(rank–r)+delta-CQI. The reference rank–r CQI in the case of multiple codewords (and multiple CQIs) can be pre-defined, for example, the CQI corresponding to codeword 1.

Figure 5:
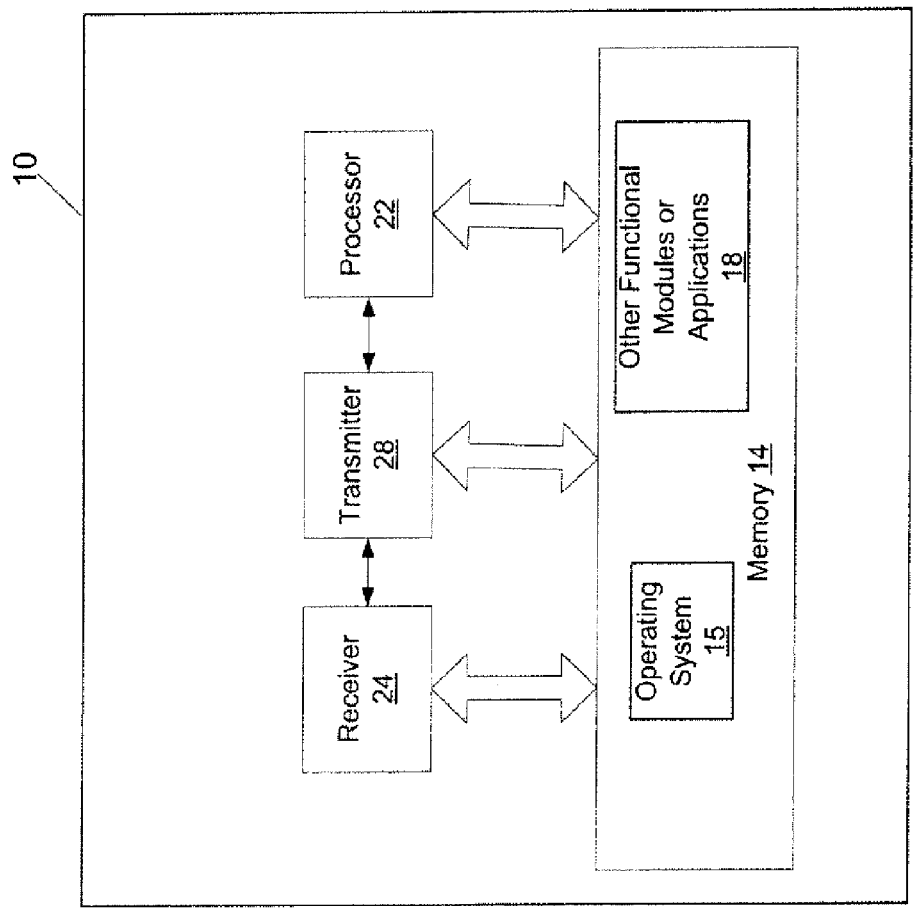
FIG. 5 illustrates an apparatus according to one embodiment.

FIG. 5 illustrates an apparatus 10 for facilitating efficient rank override in accordance with one embodiment. Apparatus 10 includes a processor 22 for processing information and executing instructions or operations. Processor 22 may be any type of general or specific purpose processor. While a single processor 22 is shown in FIG. 1, multiple processors may be utilized according to other embodiments.

Apparatus 10 further includes a memory 14, coupled to processor 22, for storing information and instructions to be executed by processor 22. Memory 14 can be comprised of any combination of random access memory ("RAM"), read only memory ("ROM"), static storage such as a magnetic or optical disk, or any other type of non-transitory machine or computer readable media.

Apparatus 10 may further include a transmitter 28 for transmitting information, such as data and/or control signals. Apparatus 10 also includes receiver 24 for receiving information including data and/or control signals. In some examples, the receiver and transmitter functionality may be implemented in a single transceiver unit.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Memory 14 and the computer program code stored thereon may be configured, with processor 22, to cause the apparatus to transmit parameters to be used by the eNB to derive rank–1 PMI from rank–r PMI, and/or transmit delta CQI that is the difference between reported rank–r CQI and optimum rank–1 CQI, as discussed above. Additionally, or alternatively, the apparatus may be caused to transmit a linear combiner that can be utilized at the eNB to use all columns of the reported rank–r PMI, and to combine those linearly in order to obtain an improved rank–1 PMI, as outlined above.

According to some embodiments, apparatus 10 may be embodied as a user equipment (UE), mobile station or terminal, such as a mobile telephone, smart phone, personal data assistant (PDA), laptop, netbook, or any other device capable of wireless communication. In other embodiments, apparatus 10 may be embodied as an eNB or other network element.

The operation of apparatus 10, which may be a UE, for computing the feedback from estimated channel may be as follows:

(1) Compute PMI/CQI/RI as usual, for example using achievable throughput as the measure for determining optimum rank, PMI and CQI. Therefore, the UE ends up with r as the optimum rank, rank–r PMI, $CQI_1$ for the first codeword and in the case where r>=2, $CQI_2$ for the second codeword. Note that additional rank–1 information is obviously not needed if r=1.

(2) Measure throughput for each rank–1 vector contained in the rank–r PMI obtained in step (1). Select the rank–1 vector maximizing throughput.

(3) Obtain corresponding CQI(rank–1), and determine the value to be reported as delta-CQI=CQI(rank–1)–$CQI_1$(rank–r).

(4) Report the rank–r and rank–1 information, namely rank–r PMI, $CQI_1$(rank–r), $CQI_2$(rank–r), obtained column index to be used as best rank–1 PMI and the delta-CQI on the uplink feedback channel. The feedback channel in an LTE-Advanced system could be either the physical uplink control channel (PUCCH) or the physical uplink shared channel (PUSCH).

The eNB would then determine whether to utilize rank–r information (typically SU-MIMO) or rank–1 information (MU-MIMO or CoMP), and compute the precoder accordingly. In the above example, throughput is used as an exemplary measure that can be utilized to determine how well each PMI matches with the channel. Additional other possible measures, such as Frobenius norm, chordal or Fubini-Study distances, or post-processing SINR, can be used in accordance with other embodiments of the invention.

Figure 6:
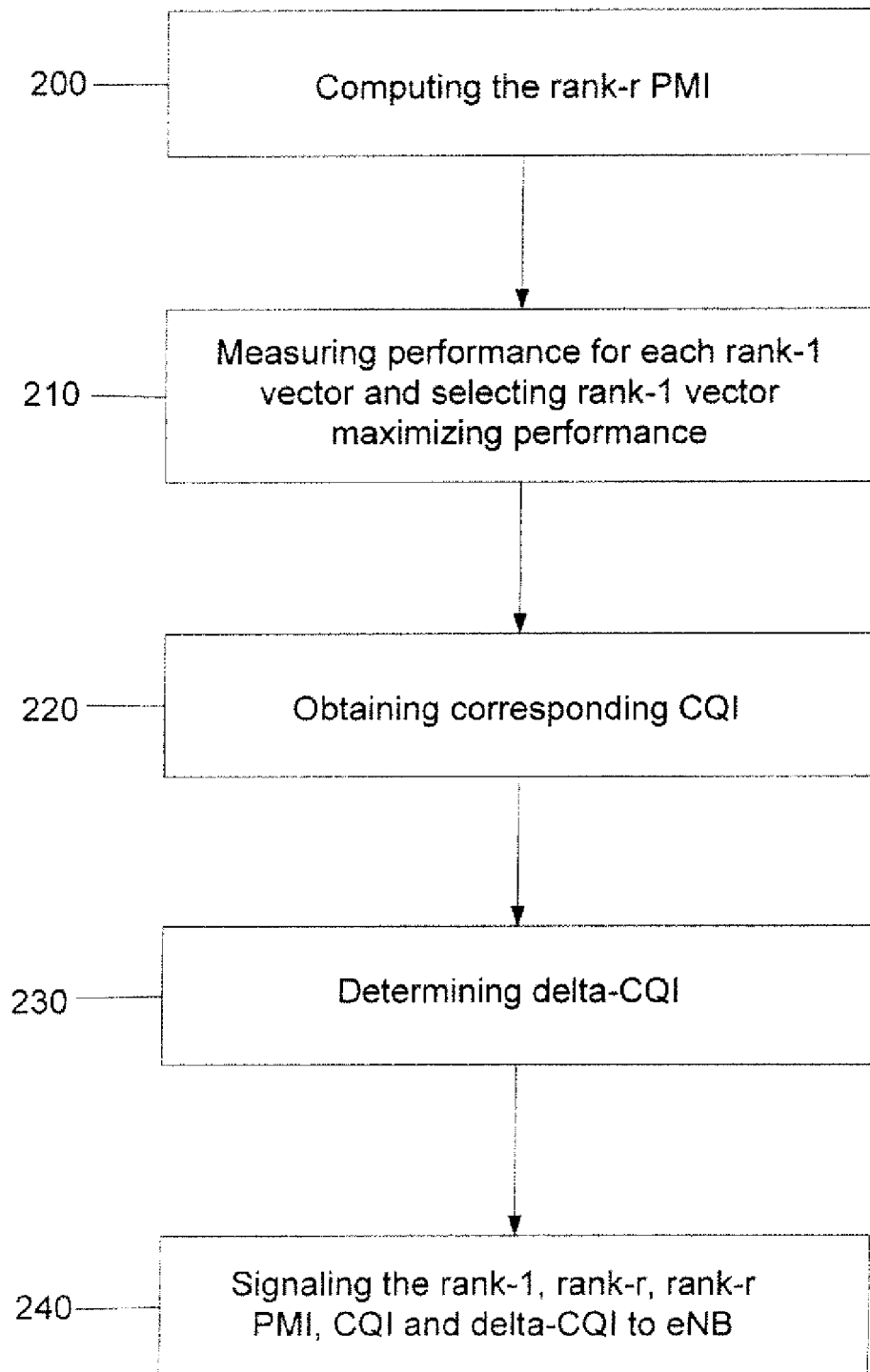
FIG. 6 illustrates a method according to an embodiment.

FIG. 6 illustrates a method for efficient performance of rank override in accordance with an embodiment. The method includes computing the rank–r PMI at 200, and measuring performance for each rank–1 vector and selecting the rank–1 vector maximizing performance at 210. The method may further include obtaining a corresponding CQI at 220, and determining a delta-CQI at 230. The rank r, rank−r PMI, rank−1, CQI, and delta CQI are then signaled to the eNB at 240.

Embodiments of the invention also include an apparatus including at least one processor, and at least one memory that includes computer program code. The at least one memory and the computer program code are configured, with the at least one processor, to cause the apparatus to compute the rank−r precoder index, measure performance for each rank−1 vector, select the rank−1 vector maximizing performance, obtain a corresponding quality indicator, determine a delta-quality indicator, and signal the rank−r, rank−r precoder index, rank−1, quality indicator, and delta quality indicator to the eNB.

In another embodiment, a computer program embodied on a computer readable medium is provided. The computer program is configured to control a processor to perform operations. The operations may include computing the rank−r precoder index, measuring performance for each rank−1 vector, selecting the rank−1 vector maximizing performance, obtaining a corresponding quality indicator, determining a delta-quality indicator, and signaling the rank r, rank−r precoder index, rank−1, quality indicator, and delta quality indicator to the eNB.

In certain embodiments, the precoder index is a precoding matrix index (PMI) and the quality indicator is a channel quality indicator (CQI). Also, in some embodiments, the rank−r precoder index refers to a precoder index within a rank−r codebook, or refers to a rank−r PMI.

Figure 2B:
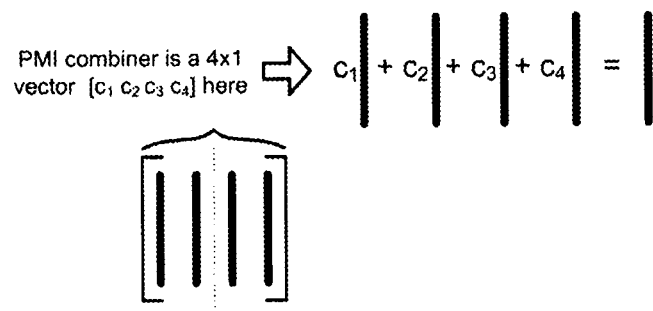
FIG. 2b illustrates an example of reporting a linear combiner in accordance with an embodiment.

Another embodiment is based on the observation that the optimum rank−1 precoder actually lies in/close to the subspace spanned by the r column vectors of the reported rank−r PMI. The rank−1 PMI could, therefore, be expressed as a linear combination of those r column vectors. Therefore, according to this embodiment, the UE computes an additional linear combiner that optimizes the information about the rank−1 PMI. The linear combiner can be based on, for example, separate codebooks. In addition, these codebooks of different dimension could be used as well as combiners between CoMP per-cell reports. This approach is illustrated in FIG. 2b, in which the rank−1 PMI is derived using a linear combination of the columns of the reported rank−4 PMI. Note that the vectors $c_2=[c_1\ c_2\ c_3\ c_4]^T$ would indeed be selected from a codebook, meaning that a certain number of bits would be used to select one vector c from a pre-defined (specified) set of vectors.

In the same way discussed above, the UE could additionally report a delta-CQI that can be used to derive a CQI corresponding to the obtained rank−1 PMI. The UE procedure for feedback computation and reporting could also be as discussed above. However, instead of trying each column of the rank−r PMI, the UE will compute rank−1 PMI with each possible linear combination using the pre-defined rank−r codebook. The UE will then report the index of the codebook entry that optimizes rank−1 throughput (or any other similar performance metric).

Figure 7:
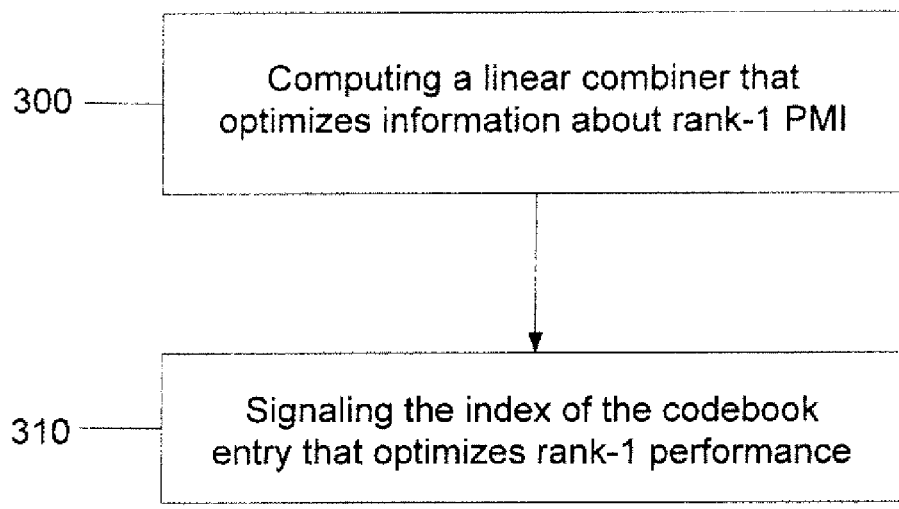
FIG. 7 illustrates another method according to one embodiment.

FIG. 7 illustrates a method for efficient performance of rank override in accordance with an embodiment. The method includes computing a linear combiner that optimizes information about rank−1 PMI at 300, and signaling the index of the codebook entry that optimizes rank−1 performance to the eNB at 310.

In another embodiment, an apparatus including at least one processor, and at least one memory that includes computer program code is provided. The at least one memory and the computer program code are configured, with the at least one processor, to cause the apparatus to compute a linear combiner that optimizes information about rank−1 precoder index, and signal the index of the codebook entry that optimizes rank−1 performance to the eNB.

According to another embodiment, a computer program embodied on a computer readable medium is provided. The computer program is configured to control a processor to perform operations. The operations may include computing a linear combiner that optimizes information about rank−1 precoder index, and signaling the index of the codebook entry that optimizes rank−1 performance to the eNB. In certain embodiments, the rank−1 precoder index is a rank−1 precoding matrix index (PMI).

It is noted that the reporting of which column corresponds to the best rank−1 PMI can be seen as a "subset" of the reporting of a linear combiner, where the codebook contains only column selection vectors, such as $[1\ 0\ 0\ 0]^T$, $[0\ 1\ 0\ 0]^T$, etc. The reporting of a linear combiner is useful over just reporting an additional rank−1 PMI/CQI, when the number of bits used for the linear combiner codebook are less than the number of bits used for reporting a PMI. When the number of bits are the same, the report may work as a refinement of feedback beneficial for MU-MIMO.

Figure 3:
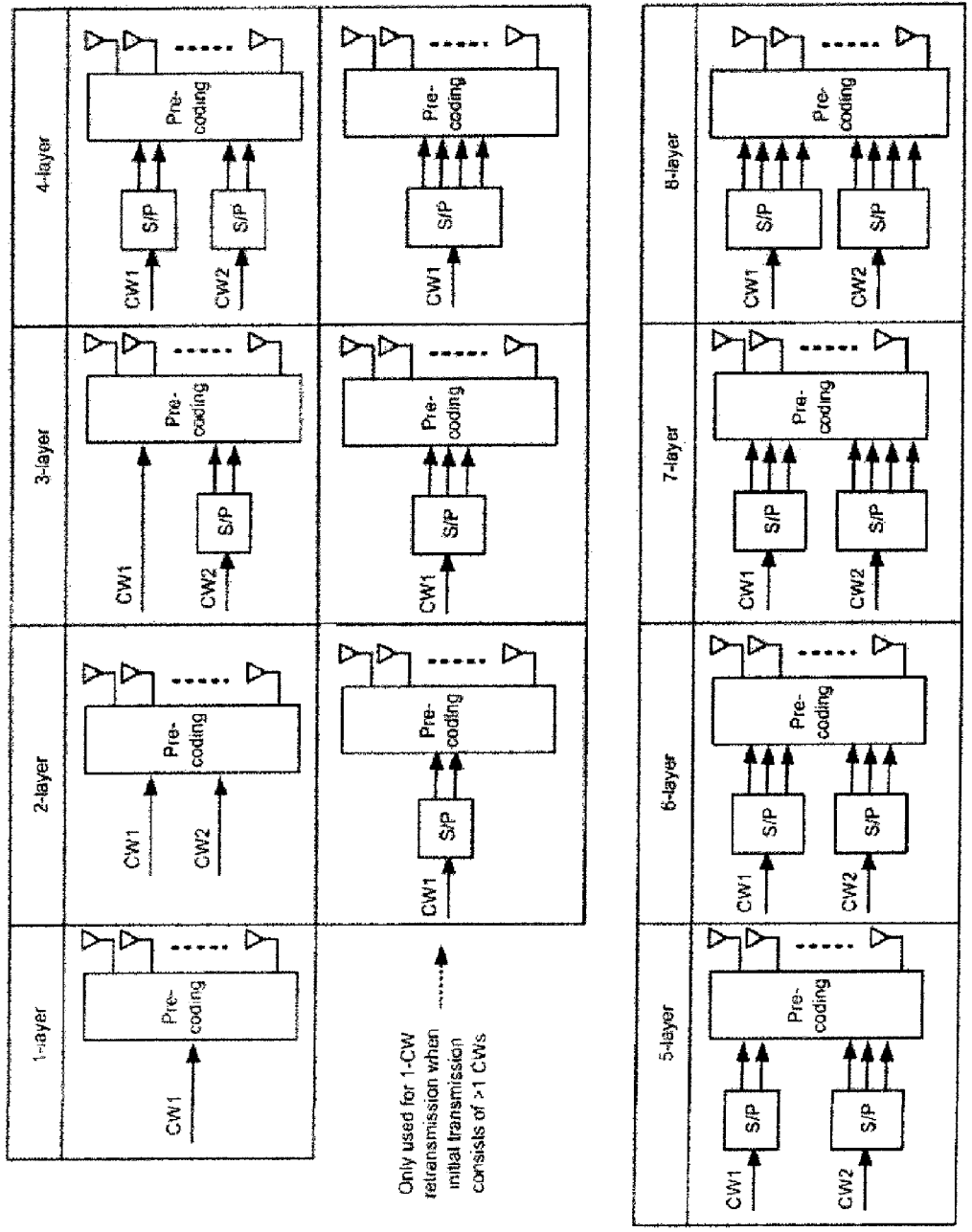
FIG. 3 illustrates a codeword to layer mapping in one embodiment.

The codeword-to-layer mapping agreed upon for LTE-Advanced in 3GPP RAN WG1 is shown in FIG. 3. Basically, a maximum of two codewords are used, each codeword corresponding to a reported CQI (i.e., the UE reports one CQI per codeword). Depending on the transmission rank, one codeword/CQI then maps to up to four spatial layers where one spatial layer now corresponds to one column of reported PMI, i.e., one set of antenna weights applied at eNB for transmission. For example, in a 4-layer case, there are two layers (two columns of the PMI) per codeword.

Figure 4:
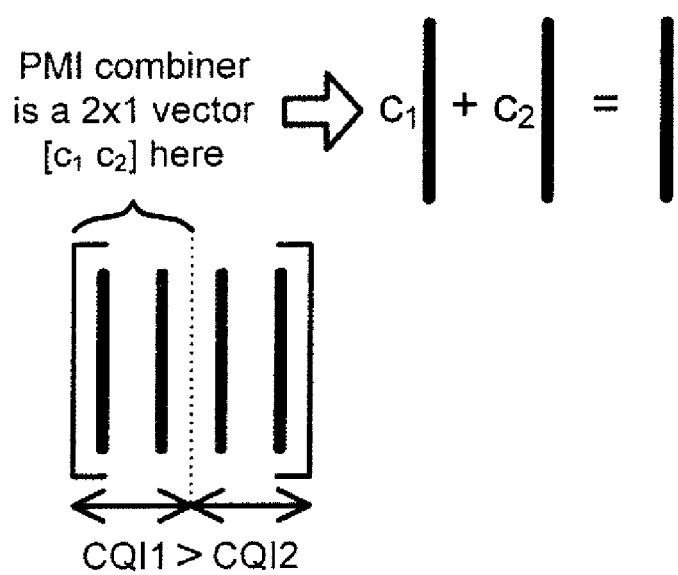
FIG. 4 illustrates a method using the columns corresponding to the best reported CQI in accordance with an embodiment.

Embodiments of the invention take further advantage of the codeword-to-layer mapping by using the CQIs that are already reported along with the rank−r PMI/CQI report. More specifically, in one embodiment, the reporting of which column corresponds to the best rank−1 PMI and/or the reporting of a linear combiner may be used only on the columns corresponding to the best reported CQI. As a result, overhead is decreased even further. An example is illustrated in FIG. 4 in which $CQI_1 > CQI_2$ and only the columns of the PMI corresponding to $CQI_1$ are used. The fact that $CQI_1 > CQI_2$ means that most of the power delivered through the radio channel is coming through the first two spatial layers. Therefore, it makes sense to search for the rank−1 PMI using those corresponding column vectors. While such an approach may be suboptimal compared to using all column vectors, it also incurs lower uplink overhead and UE complexity.

Additionally, it is noted that embodiments of the invention are not limited to rank−r→rank−1 override, but any override from rank−r to rank<r can be supported with small modifications. For instance, in the case of the reporting of which column corresponds to the best rank−1 PMI, the set of columns that correspond to the best rank<r subspace can be reported. In the case of the reporting of a linear combiner, multiple linear combiners can be used to indicate the best rank<r subspace. In addition, Delta-CQIs can be given per codeword when rank>1.

In view of the above, embodiments of the invention can provide a more efficient rank override performance than just the nested property alone. It incurs a lower uplink overhead than having a full rank−1 report on top of the rank−r report. Furthermore, complexity is reduced as the UE needs to search only for a limited number of possible rank−1 PMIs as examples of the invention take advantage of the information regarding which subspace the optimum rank−1 PMI lies.

Other examples of the invention provide a feedback method, apparatus and computer program for seamless SU- and MU-MIMO/CoMP operation. As background about the codebook structure, it is assumed that the N M×1 precoding vectors of the codebook can be grouped into N/M groups of M orthogonal vectors, i.e., into M unitary matrices of size M×M.

According to an embodiment, the UE first feeds back the normal rank-1 PMI and corresponding CQI in the usual way. The reported rank-1 PMI also defines the PMI group, i.e. one of the N/M unitary matrices. Then, additional bits are utilized for reporting the full rank-r PMI where the PMI selection is now restricted to the aforementioned PMI group, thereby significantly decreasing the number of bits needed compared to having full rank-1 PMI/CQI and full rank-r PMI/CQI simultaneously. Moreover, it provides ordered subspace beneficial for MU-MIMO.

Rank-1 PMI report comes together with a CQI report associated with a single codeword as in 3GPP LTE Release 8. It has been agreed that rank>1 transmission will operate on two codewords in LTE-Advanced, similarly to 3GPP LTE Release 8. Therefore, a rank-r PMI report with r>1 should come together with two CQIs, one for each codeword. These can be either two full CQIs or one full CQI and a delta-CQI. Embodiments of the invention provide a mechanism for linking the CQIs associated with the rank-r PMI with the CQI associated with the rank-1 PMI. Hence, in addition to reporting either two full CQIs or a full CQI and a delta-CQI, examples of the invention provide solutions that take the reported rank-1 CQI into account, as follows:

One full CQI for the other codeword, and a delta CQI with respect to the reported rank-1 CQI for the other codeword.

Two delta CQIs, one for each codeword, the reference CQI being the reported rank-1 CQI.

Two delta CQIs, one for each codeword. One delta CQI takes the rank-1 CQI as reference, and the second delta CQI takes the first delta CQI as reference.

Two delta CQIs, one for each codeword. The reference is the rank-1 CQI, but the delta CQIs could have different granularity for each.

It is noted that the delta CQIs in this case are typically "negative" deltas, i.e., only lowering the CQI. This is because adding more spatial layers cannot improve the CQI of certain codewords.

In a case where layer shifting is applied, a single CQI common to both codewords may be sufficient, or one full CQI and a delta CQI may be sufficient if it is optimized for a SIC receiver, for example. Layer shifting amounts to cyclic permutation and mapping of layer symbols to virtual antennas, and is performed prior to transmit precoding. Layer-shifting attempts to equalize the codewords' experienced effective signal to noise ratios (SNRs) by transmitting each of them on all available spatial layers.

Considering the assumed codebook structure, non-limiting examples could include codebooks designed for the 4 transmit (TX) antenna case and the 8 TX antenna case. For example, the codebook for the 4 TX antennas could be made up of 16 rank-1 vectors of size 4×1. It is assumed that the 16 rank-1 vectors can be arranged into four 4×4 unitary matrices, i.e., into matrices $A_1, A_2, A_3$ and $A_4$, where for example $A_1 = [a_{11}\ a_{12}\ a_{13}\ a_{14}]$, each vector $a_{ij}$ representing a possible rank-1 codeword (PMI), and $A_i^H A_i = I$. Similarly, for the 8 TX case there may be, for example, 64 rank-1 vectors of size 8×1 that can be arranged into eight 8×8 unitary matrices in the same way as above.

The following is an example of how the feedback computations may be performed:

(1) The UE computes the optimum rank-1 PMI/CQI optimizing throughput (or similar performance metric) taking into account all possible rank-1 codewords (PMIs) in all PMI groups as defined above.

(2) Once the rank-1 PMI is found, which essentially also defines exactly one PMI group (unitary matrix), the UE will search for the best rank-r PMI and restrict the search into that PMI group. For example, in one embodiment, the best rank-r PMI is determined as maximizing the expected throughput optimally or minimizing the chordal distance sub-optimally. As a result, only a very limited number of different PMIs need to be searched. CQI could be selected jointly with the PMI by maximizing, for example, throughput or any other similar metric. CQI reporting can then follow one of the choices previously described.

Therefore, the UE will first report the optimum rank-1 PMI using $\text{ceil}(\log_2(K))$ bits where K is the size of the codebook, which means, for instance, 4 bits with the 3GPP LTE Release 8 4-Tx codebook. Then, the UE will report the optimum rank-r PMI from the PMI group defined by the rank-1 PMI. For this, the UE may need some additional bits, for example in case of the 4TX example above, 2 additional bits may be needed, which leads to an overall PMI report size of 4+2=6 bits; while a full rank-1 and full rank-r (N=2, 3, 4) PMI report would require 4+4=8 bits in this specific case. In LTE-Advanced, the uplink channel used for feedback reporting could be either PUCCH or PUSCH.

Figure 10:
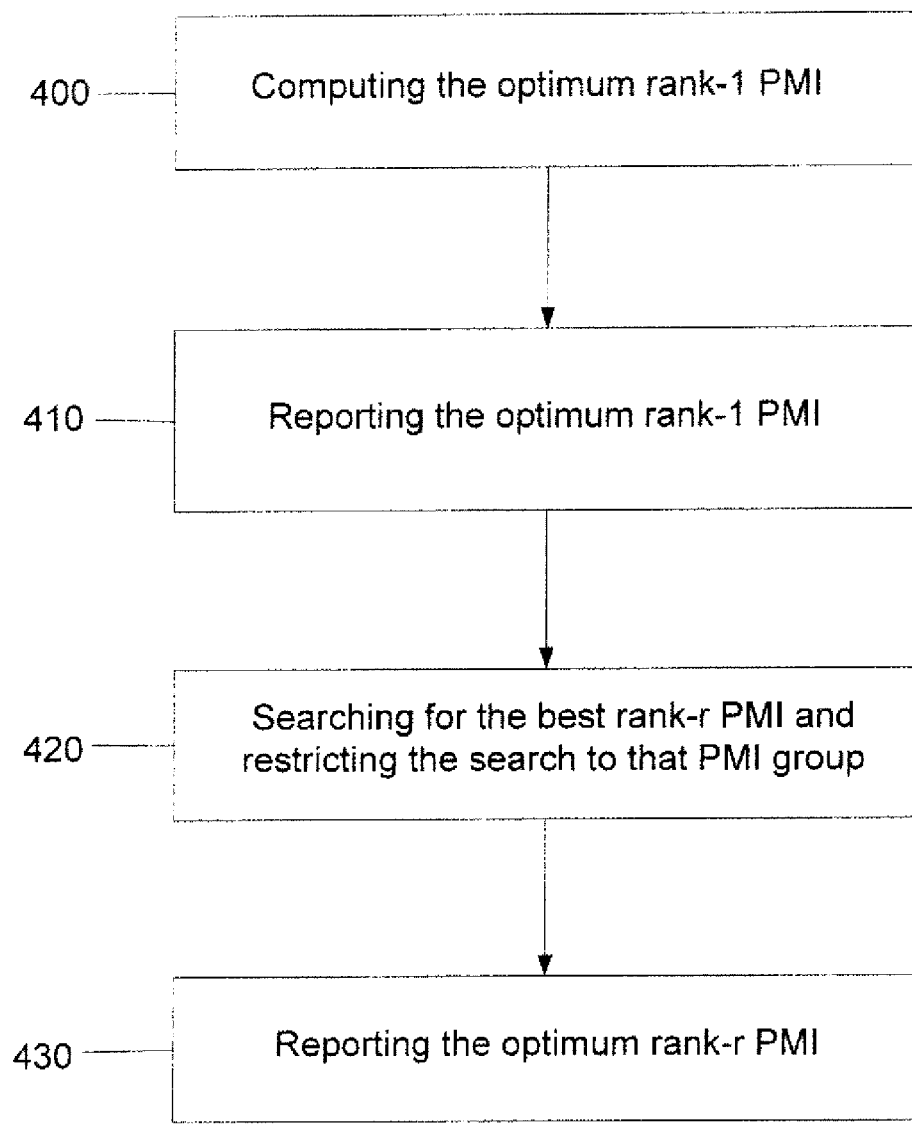
FIG. 10 illustrates a method according to another embodiment.

FIG. 10 illustrates a feedback method in accordance with one embodiment. The feedback method includes computing the optimum rank-1 PMI at 400, and reporting the optimum rank-1 PMI at 410. The method further includes searching for the best rank-r PMI and restricting the search to that PMI group at 420. In one embodiment, the PMI group to which the search is restricted is the PMI group defined by the rank-1 PMI, i.e. the one to which the rank-1 PMI belongs. The method may also include reporting the optimum rank-r PMI to an eNB at 430.

Embodiments of the invention also include an apparatus including at least one processor, and at least one memory that includes computer program code. The at least one memory and the computer program code are configured, with the at least one processor, to cause the apparatus to compute the optimum rank-1 precoder index, report the optimum rank-1 precoder index, search for the best rank-r precoder index and restrict the search to that precoder index group (i.e., the one to which the rank-1 PMI belongs), and report the optimum rank-r precoder index.

In certain embodiments, the rank-1 precoder index is a rank-1 precoding matrix index (PMI) and the rank-r precoder index is a rank-r PMI.

In another embodiment, a computer program embodied on a computer readable medium is provided. The computer program is configured to control a processor to perform operations. The operations may include computing the optimum rank-1 precoder index, reporting the optimum rank-1 precoder index, searching for the best rank-r precoder index and restricting the search to that precoder index group, and reporting the optimum rank-r precoder index.

Once received, the eNB or base station may utilize the rank-1 PMI/CQI information for MU-MIMO/CoMP purposes, or the rank-r PMI/CQI information for single-user MIMO purposes depending on the scheduling, available multi-user diversity, and MU grouping decisions.

The 3GPP Release 8 LTE codebook for 4TX antennas is specified in TS 36.211 version 8.8.0 section 6.3.4.2.3, and illustrated in FIG. 8. In one embodiment, the 4TX codebook is used to utilize the existing rank-1 codewords directly. The rank-1 vectors in the 4TX codebook can be grouped into four unitary matrices of size 4×4. This is done by grouping codebook indices 0-3, 4-7, 8-11 and 12-15 into the PMI groups. Hence, the UE would signal first one of the rank-1 vectors included in the codebook above and then signal, for example, two additional bits to indicate the rank-2 PMI from the group defined by the signaled rank-1 PMI. In one embodiment, the mapping between the signaled indices and the PMIs within the group are predefined.

In another embodiment, the 3GPP Release 8 4 TX codebook is utilized to extend the feedback signaling. Sixteen 4×4 unitary matrices are formed using the Householder formula given above. In other words, the UE will again report the optimum rank-1 PMI from the sixteen possible PMIs. Then, the UE will compute the corresponding Householder matrix $W_{=n} = I - 2u_n u_n^H / u_n^H u_n$ using the $u_n$ indicated by the rank-1 report (note, the matrix may also be stored into memory rather than computed). Next, the UE will compute the optimum rank-r PMI by taking different combinations of the columns of $W_n$. So compared to the 3GPP Release 8 operation, embodiments of the invention utilize different combinations of the columns rather than having the columns fixed as in FIG. 8. The UE will then signal to the eNB the precoder index of the optimum combination of the columns.

Figure 11:
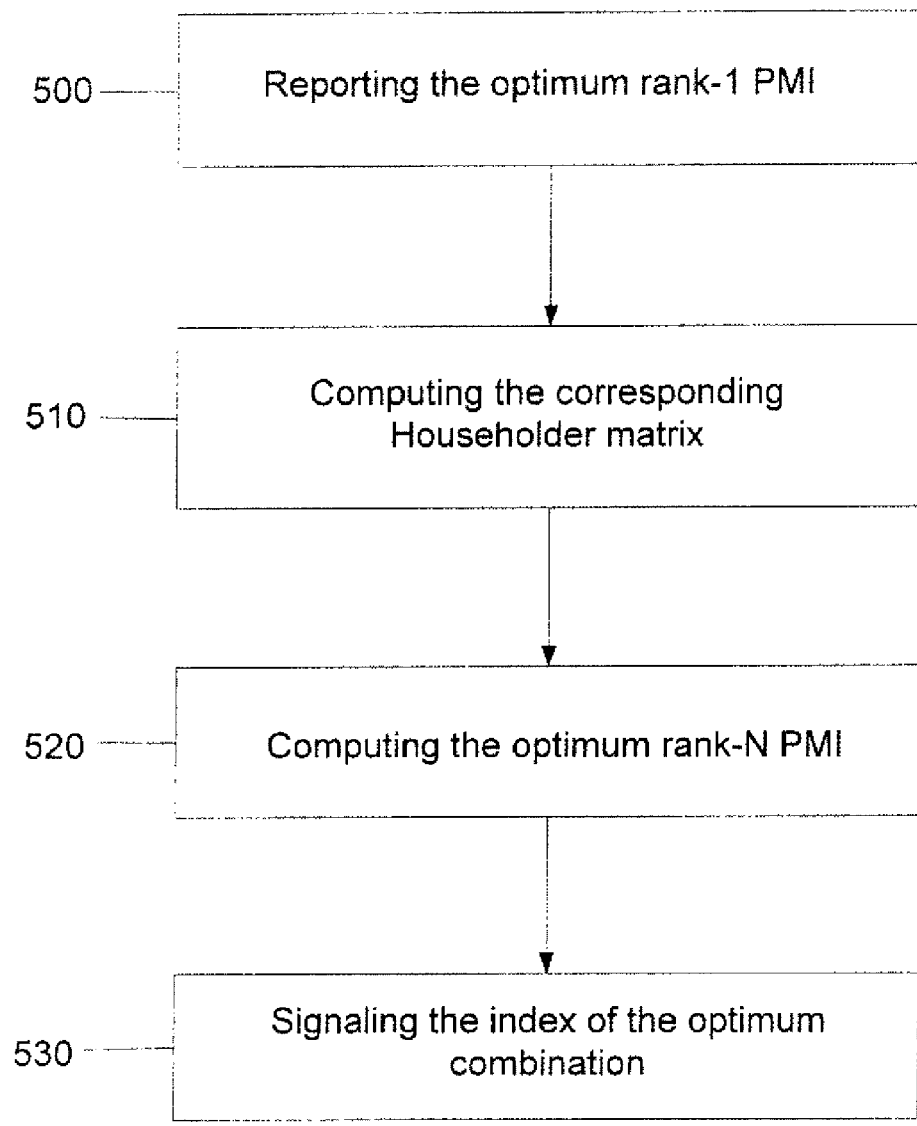
FIG. 11 illustrates a method in accordance with an embodiment.

Therefore, embodiments of the invention include a method for extending the feedback signaling as illustrated in FIG. 11. The method includes reporting the optimum rank-1 PMI at 500, and computing the corresponding Householder matrix at 510. The method may further include computing the optimum rank-r PMI based on different subsets of the r columns of the computed Householder matrix at 520, and signaling the index of the optimum column subset at 530.

Embodiments of the invention also include an apparatus including at least one processor, and at least one memory that includes computer program code. The at least one memory and the computer program code are configured, with the at least one processor, to cause the apparatus to report the optimum rank-1 precoder index, compute the corresponding Householder matrix, and compute the optimum rank-r precoder based on different subsets of the r columns of the computed Householder matrix, and signal the index of the optimum column subset to a network node. In certain embodiments, the apparatus is a UE. In this case, the UE computes a rank-1 precoder, and then computes the corresponding Householder matrix. A codebook is provided including a set of predefined subsets of columns that can be selected from the Householder matrix as the rank-r precoding matrix. So the UE can test different combinations of columns of this matrix as the precoder and determine the optimum one. Then, the index in the codebook, which corresponds to the selected combination (subsets) of columns that form the precoder, are reported.

In certain embodiments, the rank-1 precoder index corresponds to a rank-1 PMI and the rank-r precoder index corresponds to a rank-r PMI.

In another embodiment, a computer program embodied on a computer readable medium is provided. The computer program is configured to control a processor to perform operations. The operations may include reporting the optimum rank-1 precoder index, computing the corresponding Householder matrix, and computing the optimum rank-r precoder based on different subsets of the r columns of the computed Householder matrix, and signaling the index of the optimum column subset to a network node.

While some of the aforementioned examples focus on the rank-r to rank-1 override, embodiments of the invention can be generalized or extended to rank-$r_1$ to rank-$r_2$ override. In such case, the rank-$r_2$ PMI would be reported, where $r_2 < r_1$, let that define the PMI group, and the report rank-$r_1$ from within the defined PMI group. A further generalization would be to report PMIs of multiple ranks from the PMI group and hence allow multiple different rank overrides.

Some of the aforementioned embodiments additionally solve the rank override issues related to seamless operation between SU-MIMO and MU-MIMO/CoMP. Nevertheless, the extra overhead that may be needed to support the override is clearly less than having separate rank-1 and rank-r reports.

Figure 9:
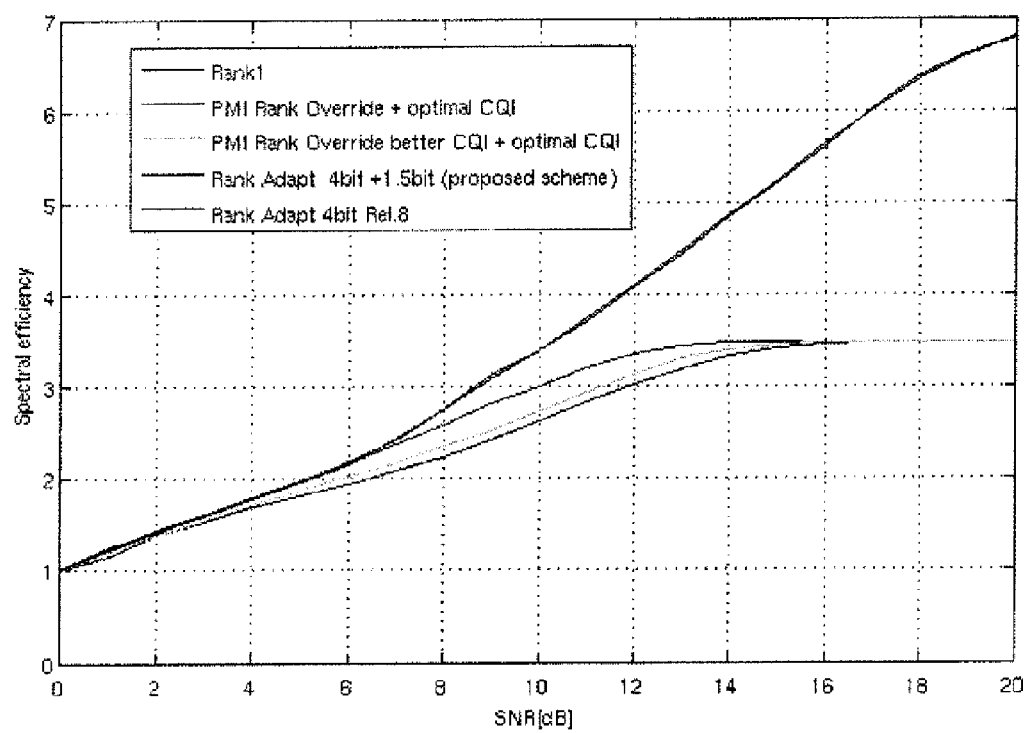
FIG. 9 illustrates a performance curve according to one embodiment.

FIG. 9 illustrates curves showing the performance of certain embodiments as simulated with link simulations. In FIG. 9, the rank 1 (red) curve is the optimum rank-1 transmission, and the green curve is rank-1 performance when only the nested property is used for the rank override from rank-2 to rank-1 together with CQI information for the best codeword. There is a 1.5 dB loss from the override even with ideal CQI, i.e. CQI mismatch is not considered here. Override from higher ranks to rank-1 will cause larger loss. Since embodiments of the invention provide ideal rank-1 information, the performance obviously matches with the red curve for rank-1 only. FIG. 9 also shows the full rank-1/rank-2 performance with rank adaptation. It can be observed that the performance according to embodiments of the invention equals that of optimum rank-2 knowledge, i.e. there is no loss at higher ranks. Therefore, in accordance with certain embodiments, the rank override issue is addressed without performance impact at higher ranks.

The computer readable media mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   determining a rank–r precoder that optimizes performance and reporting an associated rank–r precoder index to a network node;
   determining a rank–1 precoder that optimizes performance and reporting an associated rank–1 precoder index to the network node;
   wherein the rank–r precoder is determined by a search restricted to a precoder group defined by the rank–1 precoder index; and
   the rank–r precoder index is signaled with less than ceil(log 2(rank–r codebook size)) bits.

2. The method of claim 1, further comprising:
   reporting at least one quality indicator indicating a difference in a channel quality between the rank–1 precoder index and the rank–r precoder index to the network node.

3. The method of claim 1, wherein the rank–1 precoder is signaled with ceil(log 2(rank–1 codebook size) bits.

4. The method of claim 1, wherein the signaling is performed over a physical uplink control channel or a physical uplink shared channel.

5. The method of claim 1, wherein the optimizing of performance comprises maximizing an expected throughput optimally or minimizing a chordal distance suboptimally.

6. An apparatus, comprising:
   at least one processor; and
   at least one memory including computer program code,
   the at least one memory and the computer program code are configured, with the at least one processor, to cause the apparatus at least to
   determine a rank–r precoder that optimizes performance and reporting an associated rank–r precoder index to a network node;
   determine a rank–1 precoder that optimizes performance and reporting an associated rank–1 precoder index to the network node;
   wherein the rank–r precoder is determined by a search restricted to a precoder group defined by the rank–1 precoder index; and
   the rank–r precoder index is signaled with less than ceil(log 2(rank–r codebook size)) bits.

7. The apparatus of claim 6, the at least one memory and the computer program code are further configured, with the at least one processor, to cause the apparatus at least to
   report at least one quality indicator indicating a difference in a channel quality between the rank–1 precoder index and the rank–r precoder index to the network node.

8. The apparatus of claim 6, wherein the rank–1 precoder is signaled with ceil(log 2(rank–1 codebook size) bits.

9. The apparatus of claim 6, wherein the signaling is performed over a physical uplink control channel or a physical uplink shared channel.

10. The apparatus of claim 6, wherein the optimizing of performance comprises maximizing an expected throughput optimally or minimizing a chordal distance suboptimally.

11. An apparatus, comprising:
    at least one processor; and
    at least one memory including computer program code,
    the at least one memory and the computer program code are configured, with the at least one processor, to cause the apparatus at least to
    determine a rank–r precoder that optimizes performance and reporting an associated rank–r precoder index to a network node;
    determine a rank–1 precoder that optimizes performance and reporting an associated rank–1 precoder index to the network node;
    and report at least one rank–r quality indicator to the network node;
    wherein the rank–1 precoder index indicates a combining vector for a subset of columns of the rank–r precoder having a best rank–r quality indicator.

12. The apparatus of claim 11, wherein the at least one quality indicator indicates a difference in a channel quality between the rank–1 precoder index and the rank–r precoder index.

13. The apparatus of claim 11, wherein the rank–r precoder is signaled with ceil(rank–r codebook size) bits.

14. The apparatus of claim 11, wherein the optimizing of performance comprises maximizing an expected throughput optimally or minimizing a chordal distance suboptimally.

15. The apparatus of claim 11, wherein the rank–1 precoder index is signaled with less than ceil(log 2(rank–1 codebook size)) bits.

16. The apparatus of claim 11, the at least one memory and the computer program code are further configured, with the at least one processor, to cause the apparatus at least to
    determine a rank<r precoder that optimizes performance and reporting an associated rank<r precoder index to the network node wherein the rank<r precoder index indicates a combining vector.

17. The apparatus of claim 16, the at least one memory and the computer program code are further configured, with the at least one processor, to cause the apparatus at least
    report for each of a plurality of codewords a second quality indicator indicating a difference in a channel quality between the rank<r precoder index and the rank–r precoder index to the network node.

* * * * *